US012656197B2

(12) United States Patent
Haga

(10) Patent No.: US 12,656,197 B2
(45) Date of Patent: Jun. 16, 2026

(54) FORCE SENSOR AND FORCE DETECTION SYSTEM PRESSING FORCE SENSOR

(71) Applicant: Japan Display Inc., Tokyo (JP)

(72) Inventor: Yuta Haga, Tokyo (JP)

(73) Assignee: Japan Display Inc., Tokyo (JP)

( * ) Notice: Subject to any disclaimer, the term of this patent is extended or adjusted under 35 U.S.C. 154(b) by 324 days.

(21) Appl. No.: 18/428,772

(22) Filed: Jan. 31, 2024

(65) Prior Publication Data

US 2024/0272024 A1     Aug. 15, 2024

(30) Foreign Application Priority Data

Feb. 13, 2023     (JP) .................................. 2023-020249

(51) Int. Cl.
G01L 1/26          (2006.01)
G01L 1/20          (2006.01)

(52) U.S. Cl.
CPC ................ G01L 1/26 (2013.01); G01L 1/205 (2013.01)

(58) Field of Classification Search
CPC .............. G01L 1/26; G01L 1/205; G01L 1/20
See application file for complete search history.

(56) References Cited

FOREIGN PATENT DOCUMENTS

JP          2018-146489 A      9/2018

*Primary Examiner* — Tarun Sinha
(74) *Attorney, Agent, or Firm* — K&L Gates LLP

(57) ABSTRACT

A force sensor includes a plurality of detection electrodes disposed in respective individual detection regions, a sensor layer facing the detection electrodes, a common electrode through which current flows to the detection electrodes via the sensor layer at inputting of force, a plurality of signal lines that are coupled to the detection electrodes and through which the current having flowed to the detection electrodes is output to outside, a plurality of switch elements configured to open and close the coupling of the signal lines and the detection electrodes, a plurality of gate lines for controlling opening and closing of the switch elements, a plurality of correction circuits disposed in the respective individual detection regions, and correction gate lines for driving the correction circuits.

6 Claims, 14 Drawing Sheets

Figure 7:
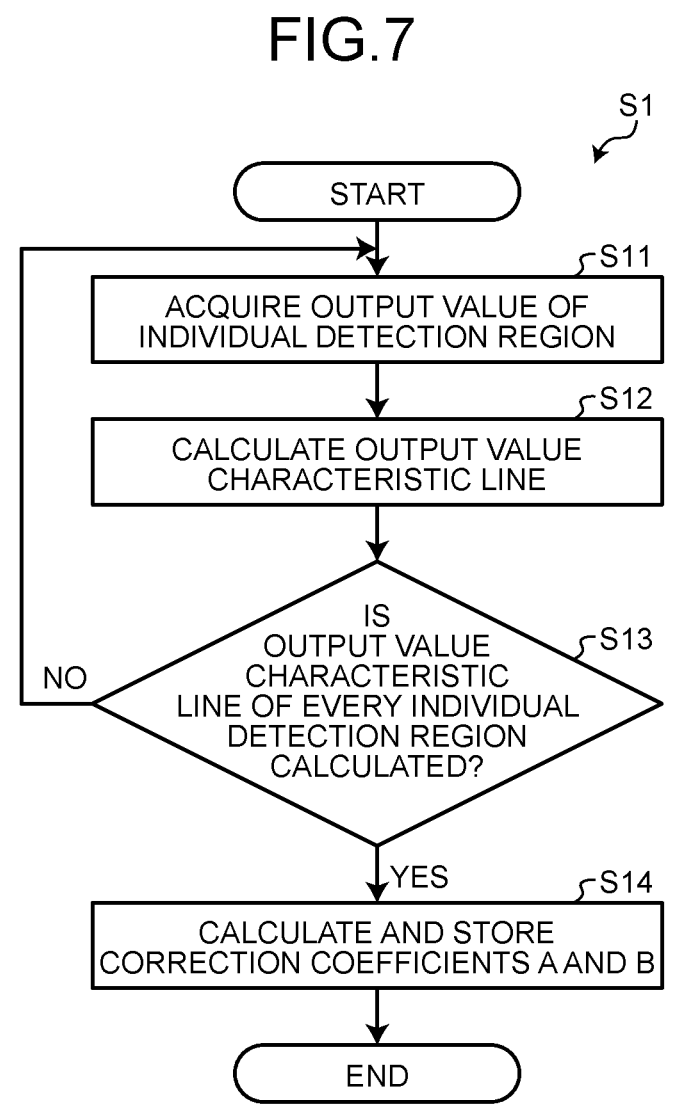

```
        ┌──────────────┐
        │    START     │
        └──────────────┘
                │
                ▼
   ┌─────────────────────────────┐  S11
   │  ACQUIRE OUTPUT VALUE OF     │
   │  INDIVIDUAL DETECTION REGION │
   └─────────────────────────────┘
                │
                ▼
   ┌─────────────────────────────┐  S12
   │  CALCULATE OUTPUT VALUE      │
   │  CHARACTERISTIC LINE         │
   └─────────────────────────────┘
                │
                ▼
             ╱─────╲
           ╱    IS    ╲
        ╱  OUTPUT VALUE  ╲
NO    ╱   CHARACTERISTIC   ╲  S13
◄────╱ LINE OF EVERY INDIVIDUAL ╲
      ╲  DETECTION REGION  ╱
        ╲  CALCULATED?   ╱
           ╲         ╱
             ╲─────╱
                │ YES
                ▼
   ┌─────────────────────────────┐  S14
   │  CALCULATE AND STORE         │
   │  CORRECTION COEFFICIENTS A AND B │
   └─────────────────────────────┘
                │
                ▼
        ┌──────────────┐
        │     END      │
        └──────────────┘
```

FIG.10

| IDENTIFICATION NUMBER OF INDIVIDUAL DETECTION REGION | A | B |
|---|---|---|
| 1 | $A_1$ | $B_1$ |
| 2 | $A_2$ | $B_2$ |
| ⋮ | ⋮ | ⋮ |
| N | $A_n$ | $B_n$ |

S2

START

S21
ACQUIRE OUTPUT VALUE OF EVERY
INDIVIDUAL DETECTION REGION

S22
CALCULATE CORRECTED
OUTPUT VALUE

S23
CALCULATE FORCE VALUE

END

S3

START

S1A
CALCULATE CORRECTION DATA

S2
CALCULATE FORCE VALUE

S31
IS FORCE VALUE
OF EVERY INDIVIDUAL
DETECTION REGION
CALCULATED?

NO

YES

END

FIG.16

FORCE SENSOR AND FORCE DETECTION SYSTEM PRESSING FORCE SENSOR

CROSS-REFERENCE TO RELATED APPLICATION

This application claims the benefit of priority from Japanese Patent Application No. 2023-020249 filed on Feb. 13, 2023, the entire contents of which are incorporated herein by reference.

BACKGROUND

1. Technical Field

The present disclosure relates to a force sensor and a force detection system.

2. Description of the Related Art

A force detection system includes a force sensor to which force is input and a control device configured to calculate a force value based on an output value that is output from the force sensor. A force sensor of Japanese Patent Application Laid-open Publication No. 2018-146489 includes an array substrate provided with a plurality of detection electrodes, a common electrode facing the detection electrodes, and a sensor layer sandwiched between the detection electrodes and the common electrode. When force is input to the force sensor, the common electrode and the sensor layer deform toward the array substrate. Then, when the sensor layer contacts the detection electrode, current flows from the common electrode to the detection electrodes through the sensor layer. The sensor layer contains conductive particles dispersed inside insulating resin. As the resin deforms, the conductive particles contact one another and the resistance value of the sensor layer decreases. As the amount of deformation of the resin increases, the number of conductive particles contacting one another increases and the decrease amount of the resistance value of the sensor layer increases. Thus, the value of current flowing to the detection electrodes increases as force input to the force sensor increases. In this manner, the force sensor can detect force at each detection electrode. In other words, the force sensor has a detection region divided into a plurality of individual detection regions.

Characteristics of each switch element such as a thin film transistor (TFT) is different for each individual detection region in some cases. Furthermore, characteristics vary for each path through which a detection signal (current) detected by a detection electrode is transferred to the control device, in other words, for the path of each analog front end (hereinafter referred to as AFE) in some cases. For such a reason, different output values are received by the control device in some cases even when force of the same magnitude is input to a plurality of individual detection regions. Thus, the control device corrects the output value of each individual detection region.

To acquire correction data for the individual detection regions, it is needed to apply uniform force to each individual detection region and acquire the output value of the individual detection region. In an exemplary method of applying uniform force to each individual detection region, a jig that can contact the entire detection region is prepared and pressed against the detection region. However, in a case where a detection surface included in the detection region has minute irregularity and distortion, uniform force is not applied to each individual detection region when the jig is pressed. Thus, it is desired to acquire correction data by a simple method other than the method of applying uniform force to the detection surface.

The present disclosure is intended to provide a force sensor and a force detection system that are capable of acquiring correction data by a simple method.

SUMMARY

A force sensor according to a first embodiment of the present disclosure includes a plurality of detection electrodes disposed in respective individual detection regions, a sensor layer facing the detection electrodes, a common electrode through which current flows to the detection electrodes via the sensor layer at inputting of force, a plurality of signal lines that are coupled to the detection electrodes and through which the current having flowed to the detection electrodes is output to outside, a plurality of switch elements configured to open and close the coupling of the signal lines and the detection electrodes, a plurality of gate lines for controlling opening and closing of the switch elements, a plurality of correction circuits disposed in the respective individual detection regions, and correction gate lines for driving the correction circuits. A value of the current output through the signal lines is proportional to the magnitude of force input to the individual detection regions, each correction circuit includes a first wire and a second wire each having one end coupled to the common electrode and the other end coupled to the signal lines, the first wire and the second wire being coupled in parallel to the detection electrodes and the switch elements, the first wire includes a first resistance component having a first resistance value, and a first wire switch element configured to open and close the first wire, the second wire includes a second resistance component having a second resistance value larger than the first resistance value, and a second wire switch element configured to open and close the second wire, and the correction gate lines include a first correction gate line for controlling the first wire switch element, and a second correction gate line for controlling the second wire switch element.

A force sensor according to a second embodiment of the present disclosure includes a plurality of detection electrodes disposed in respective individual detection regions, a sensor layer facing the detection electrodes, a common electrode through which current flows to the detection electrodes via the sensor layer at inputting of force, a plurality of signal lines that are coupled to the detection electrodes and through which current having flowed to the detection electrodes is received, a plurality of switch elements configured to open and close the coupling of the signal lines and the detection electrodes, a plurality of gate lines for controlling opening and closing of the switch elements, a plurality of correction circuits disposed in a detection target region outside the individual detection regions, correction gate lines for driving the correction circuits, and a correction signal line for outputting signals from the correction circuits. A value of the current output through the signal lines is proportional to the magnitude of force input to the individual detection regions, the detection electrodes are arrayed in a first direction in which the signal lines extend and a second direction intersecting the first direction, the correction circuits are provided for the respective detection electrodes arrayed in the second direction, each correction circuit includes a first wire and a second wire each having one end coupled with the common electrode common to the detection electrodes arrayed in the second direction and the other end coupled with the correction signal line, the first wire includes a first resistance component having a first resistance value, and a first wire switch element configured to open and close the first wire, the second wire includes a second resistance component having a second resistance value larger than the first resistance value, and a second wire switch element configured to open and close the second wire, the correction gate lines include a first correction gate line for controlling the first wire switch element, and a second correction gate line for controlling the second wire switch element.

A force sensor according to a third embodiment of the present disclosure includes a plurality of detection electrodes disposed in respective individual detection regions, a sensor layer facing the detection electrodes, a common electrode through which current flows to the detection electrodes via the sensor layer at inputting of force, a plurality of signal lines that are coupled to the detection electrodes and through which current having flowed to the detection electrodes is received, a plurality of switch elements configured to open and close the coupling of the signal lines and the detection electrodes, a plurality of gate lines for controlling opening and closing of the switch elements, a plurality of correction circuits disposed in a detection target region outside the individual detection regions, and a correction gate lines for driving the correction circuits. A value of the current output through the signal lines is proportional to the magnitude of force input to the individual detection regions, the detection electrodes are arrayed in a first direction in which the signal lines extend and a second direction intersecting the first direction, the correction circuits are provided for the plurality of respective detection electrodes arrayed in the first direction, each correction circuit includes a first wire and a second wire each having one end coupled to the common electrode and the other end coupled to a signal line common to the detection electrodes arrayed in the first direction, each correction circuit includes a first wire and a second wire each having the other end coupled to the signal line, the first wire includes a first resistance component having a first resistance value, and a first wire switch element configured to open and close the first wire, the second wire includes a second resistance component having a second resistance value larger than the first resistance value, and a second wire switch element configured to open and close the second wire, and the correction gate lines include a first correction gate line for controlling the first wire switch element, and a second correction gate line for controlling the second wire switch element.

A force detection system according to an embodiment of the present disclosure includes the force sensor, and a control device configured to calculate a force value based on results of outputting from the signal lines of the force sensor. The control device calculates an output value characteristic line for each individual detection region based on a first output value when the first wire switch element is closed and a second output value when the second wire switch element is closed, calculates a correction coefficient with which the output value characteristic line matches a correction target line representing a desired output value, and corrects an output value by using the correction coefficient.

BRIEF DESCRIPTION OF THE DRAWINGS

FIG. 7 is a diagram illustrating the process of correction data calculation processing in the first embodiment;

FIG. 10 is a diagram illustrating correction coefficients A and B stored in a storage unit of a control device;

FIG. 16 is a sectional view illustrating a section of a force sensor of a second modification.

DETAILED DESCRIPTION

Aspects (embodiments) of a force sensor of the present disclosure will be described below in detail with reference to the accompanying drawings. Contents described below in the embodiments do not limit the invention of the present disclosure. Constituent components described below include those that could be easily thought of by the skilled person in the art and those identical in effect. Constituent components described below may be combined as appropriate. What is disclosed herein is merely exemplary, and any modification that could be easily thought of by the skilled person in the art as appropriate without departing from the gist of the invention is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and the drawings, any constituent component same as that already described with reference to an already described drawing is denoted by the same reference sign, and detailed description thereof is omitted as appropriate in some cases.

In the present specification and the claims, an expression with "on" in description of an aspect in which one structural body is disposed on another structural body includes both a case in which the one structural body is directly disposed on the other structural body in contact and a case in which the one structural body is disposed above the other structural body with still another structural body interposed therebetween, unless otherwise stated in particular.

First Embodiment

Figure 1:
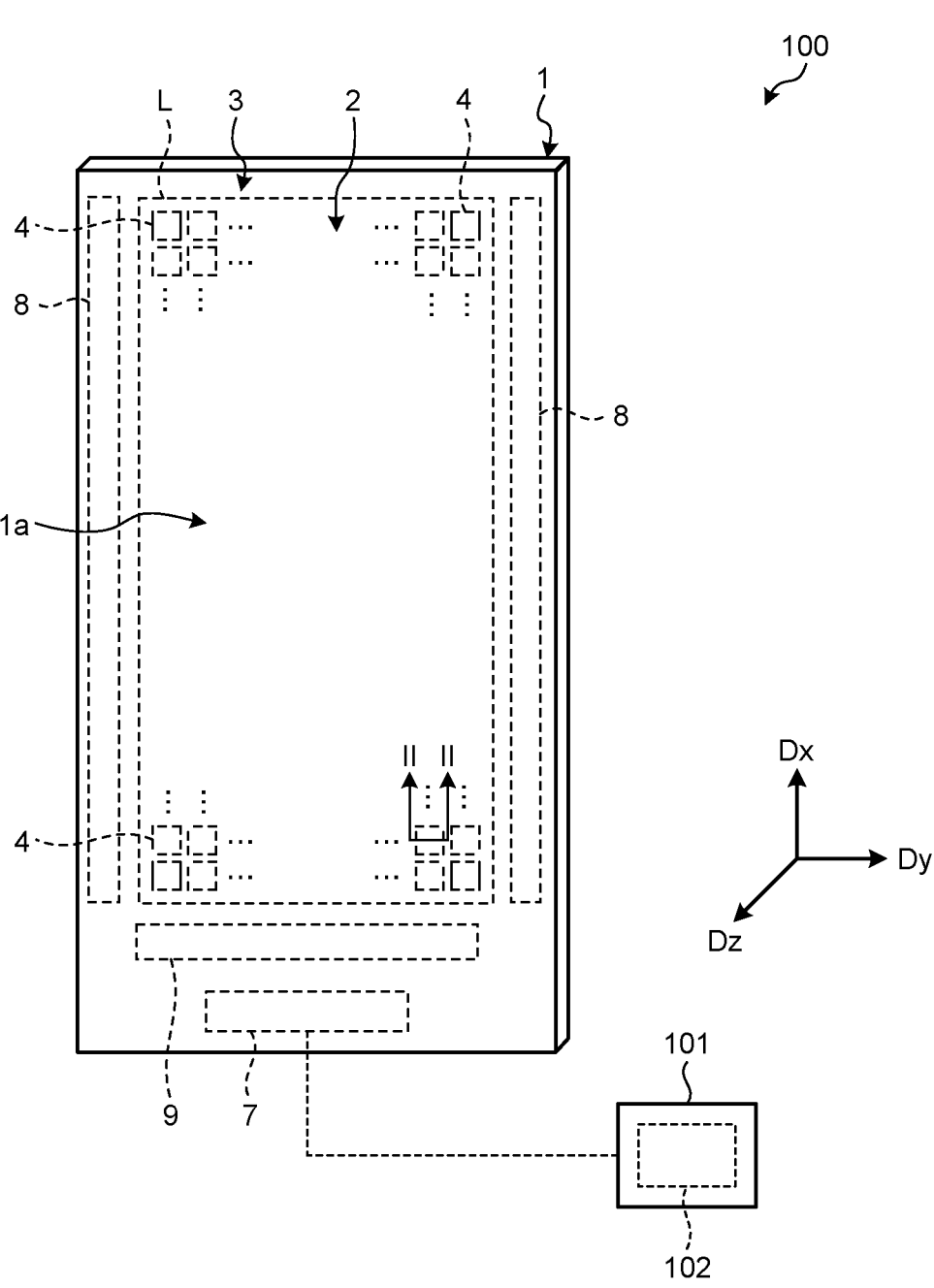
FIG. 1 is a perspective view schematically illustrating a force detection system according to a first embodiment.

FIG. 1 is a perspective view schematically illustrating a force detection system according to a first embodiment. As illustrated in FIG. 1, a force detection system 100 includes a force sensor 1 and a control device 101. The force sensor 1 is formed in a flat plate shape and includes a detection surface 1a to detect force. The force sensor 1 is formed in a rectangular shape when viewed in the normal direction of the detection surface 1a. The detection surface 1a of the force sensor 1 is divided into a detection region 2 in which force can be detected and a peripheral region 3 surrounding the outside of the detection region 2. The detection region 2 is divided into a plurality of individual detection regions 4. In FIG. 1, a virtual line L is illustrated to facilitate recognition of the boundary between the detection region 2 and the peripheral region 3.

The individual detection regions 4 are arrayed in a first direction Dx and a second direction Dy. The first direction Dx is parallel to the detection surface 1a. The second direction Dy is parallel to the detection surface 1a and intersects the first direction Dx. In the present embodiment, the first direction Dx is parallel to a long side of the force sensor 1. The second direction Dy is parallel to a short side of the force sensor 1. Accordingly, the first direction Dx and the second direction Dy are orthogonal to each other. The normal direction of the detection surface 1a is orthogonal to the first direction Dx and the second direction Dy and referred to as a third direction Dz in some cases.

Figure 2:
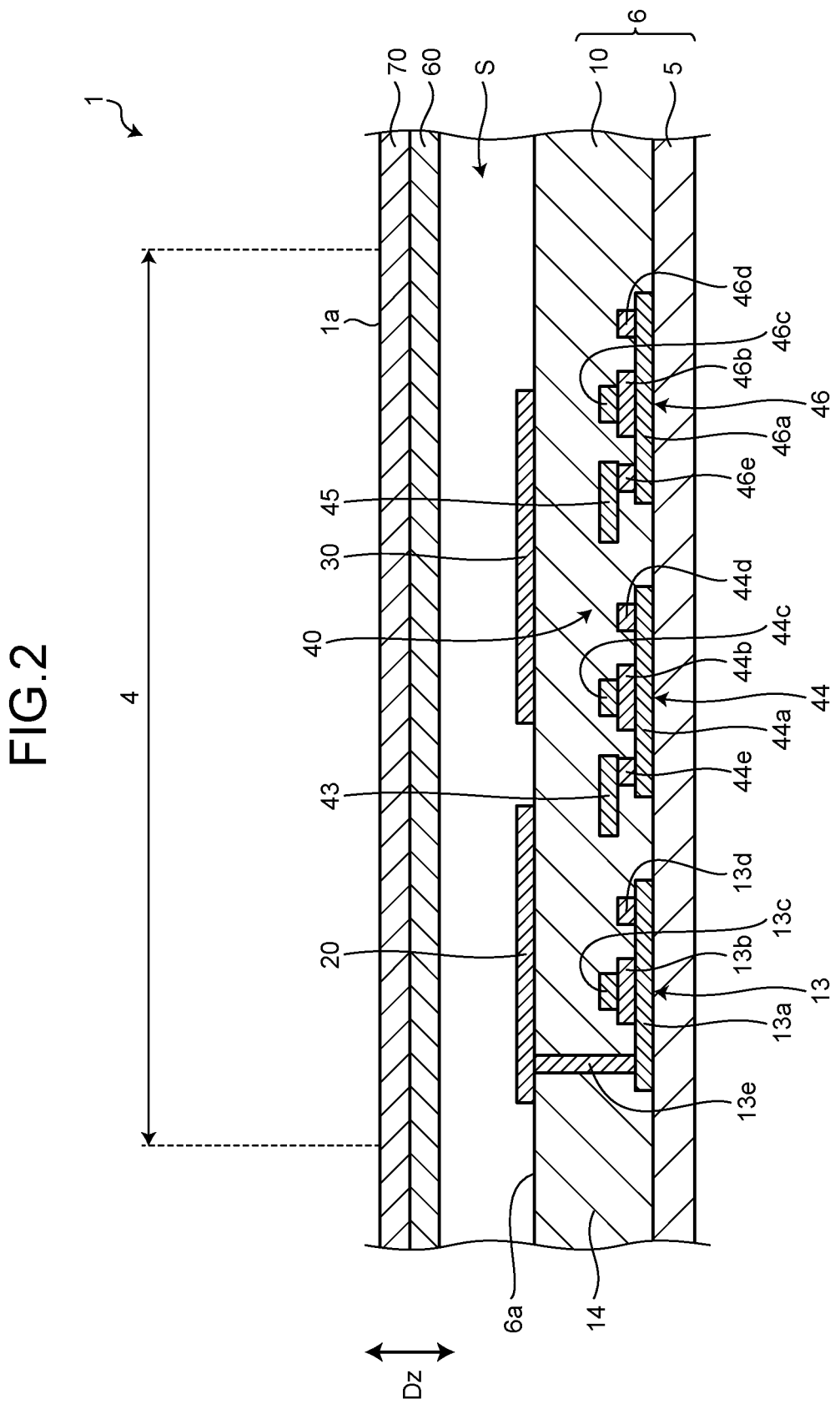
FIG. 2 is a sectional view taken along line II-II in FIG. 1 when viewed in the direction of arrows.

FIG. 2 is a sectional view taken along line II-II in FIG. 1 when viewed in the direction of arrows. As illustrated in FIG. 2, the force sensor 1 includes a substrate 5, a circuit formation layer 10, a detection electrode 20, a common electrode 30, a sensor layer 60, and a protective layer 70.

The substrate 5 is an insulating plate material. The substrate 5 is, for example, a glass substrate, a resin substrate, or a resin film. The substrate 5 is integrates with the circuit formation layer 10 to form an array substrate 6. In the following description, an upper side is one side in the third direction Dz and means a side on which the circuit formation layer 10 is disposed when viewed from the substrate 5.

A plurality of drive transistors (switch elements) 13 are provided in a region in which the circuit formation layer 10 overlaps the detection region 2. The drive transistors 13 correspond to the array of the individual detection regions 4 and are arrayed in the first direction Dx and the second direction Dy. Accordingly, one drive transistor 13 is provided in each individual detection region 4. In addition, a plurality of correction circuits 40 and correction gate lines 50 (refer to FIG. 3) are provided in the circuit formation layer 10. The correction circuits 40 and the correction gate lines 50 will be described later.

The circuit formation layer 10 includes various components for driving the drive transistors 13. Specifically, as illustrated in FIG. 1, the circuit formation layer 10 includes a coupling part 7, gate line drive circuits 8, a signal line selection circuit 9, gate lines 11 (refer to FIG. 3), and signal lines 12 (refer to FIG. 3).

The coupling part 7, the gate line drive circuits 8, and the signal line selection circuit 9 are disposed in the peripheral region 3. The coupling part 7 is used to couple with a drive integrated circuit (IC) disposed outside the force sensor 1. In the present embodiment, the control device 101 has functions of the drive IC, and the coupling part 7 is coupled to the control device 101. In the present disclosure, the drive IC may be mounted as a chip-on film (COF) on a flexible printed board or a rigid substrate coupled with the coupling part 7. Alternatively, the drive IC may be mounted as a chip-on glass (COG) in the peripheral region 3.

The gate line drive circuits 8 are circuits configured to drive the gate lines 11 (refer to FIG. 3) based on various kinds of control signals from the control device 101. The gate line drive circuits 8 sequentially or simultaneously select the gate lines 11 and supply a gate drive signal to the selected gate lines 11. The signal line selection circuit 9 is a switch circuit configured to sequentially or simultaneously select the signal lines 12 (refer to FIG. 3). The signal line selection circuit 9 is, for example, a multiplexer. The signal line selection circuit 9 couples the selected signal lines 12 to the control device 101 based on a selection signal supplied from the control device 101.

Figure 3:
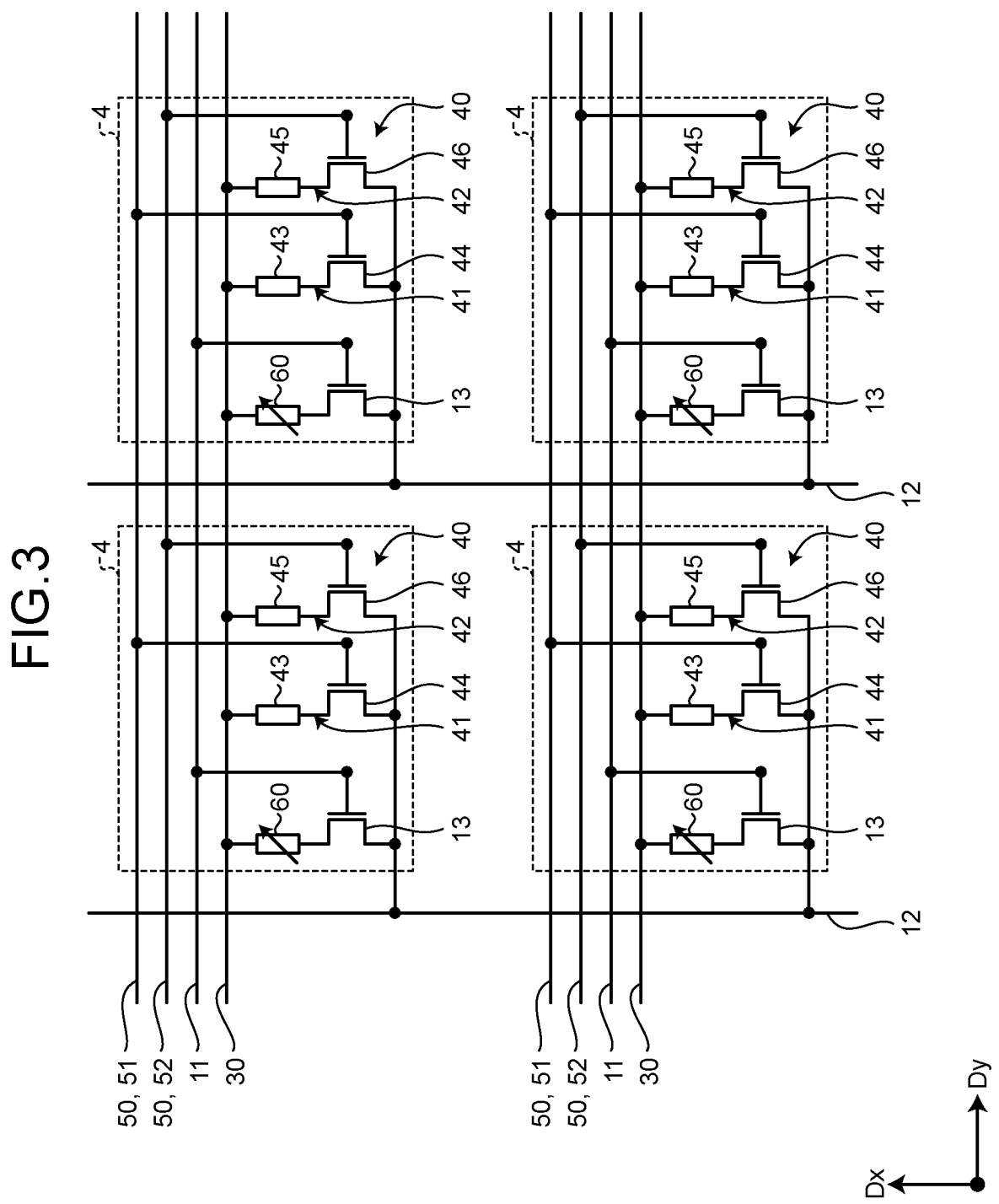
FIG. 3 is a circuit diagram illustrating a circuit configuration of a force sensor of the first embodiment.

FIG. 3 is a circuit diagram illustrating a circuit configuration of the force sensor of the first embodiment. As illustrated in FIG. 3, the gate lines 11 extend in the second direction Dy. The gate lines 11 are arrayed in the first direction Dx. The signal lines 12 extend in the first direction Dx. The signal lines 12 are arrayed in the second direction Dy. In addition, although not particularly illustrated, the circuit formation layer 10 includes a common wire extending along the peripheral region 3. The common wire is a wire for supplying current to the common electrode 30. The common wire is coupled to the control device 101 through the coupling part 7 and supplied with a constant amount of current from the control device 101.

As illustrated in FIG. 2, each drive transistor 13 includes a semiconductor layer 13a, a gate insulating film 13b, a gate electrode 13c, a drain electrode 13d, and a source electrode 13e. The source electrode 13e is coupled to the detection electrode 20. The gate electrode 13c is coupled to a gate line 11. The drain electrode 13d is coupled to a signal line 12. Accordingly, when the gate line 11 is scanned, the detection electrode 20 is closed. As a result, an electric signal (current value) input to the detection electrode 20 is output to the signal line 12.

In the array substrate 6, a first surface 6a facing the sensor layer 60 is flattened by an insulating layer 14 covering the drive transistors 13 and the like.

The detection electrode 20 and the common electrode 30 are provided on the first surface 6a of the array substrate 6. The detection electrode 20 and the common electrode 30 are made of a metallic material such as indium tin oxide (ITO). In the present disclosure, the detection electrode 20 and the common electrode 30 may be made of metallic materials different from each other and are not particularly limited.

The common electrode 30 is coupled to the common wire (not illustrated) through a non-illustrated wire buried in the insulating layer 14 of the circuit formation layer 10. Accordingly, the common electrode 30 is supplied with a constant amount of current from the control device 101. The common electrode 30 is separated from the detection electrode 20.

The sensor layer 60 is a made of a material containing conductive fine particles inside a highly insulating resin layer. The fine particles are separated from one another inside the resin layer. Accordingly, the resistance value of the sensor layer 60 is large when the resin layer is not deformed. When the resin layer is deformed, the fine particles contact or approach one another and the resistance value of the sensor layer 60 decreases. As the deformation amount of the resin layer increases, the number of contacting fine particles increases and the resistance value of the sensor layer 60 largely decreases. The sensor layer 60 is also called a pressure-sensitive layer.

As illustrated in FIG. 2, the sensor layer 60 is disposed on the upper side of the array substrate 6. Accordingly, the sensor layer 60 faces the detection electrode 20 and the common electrode 30. The sensor layer 60 is supported by a spacer (not illustrated) provided on the array substrate 6. Accordingly, a space S is provided on the lower side of the sensor layer 60, and the sensor layer 60 is separated from each of the detection electrode 20 and the common electrode 30. The spacer (not illustrated) may be provided in the peripheral region 3 on the first surface 6*a* of the array substrate 6 or provided between the individual detection regions 4 and is not particularly limited in the present disclosure.

The protective layer 70 is an insulating layer disposed on the upper side of the sensor layer 60 and extending along the sensor layer 60. The protective layer 70 is integrated with the sensor layer 60 by a non-illustrated bonding layer. The upper surface of the protective layer 70 is the detection surface 1*a*.

Figure 4:
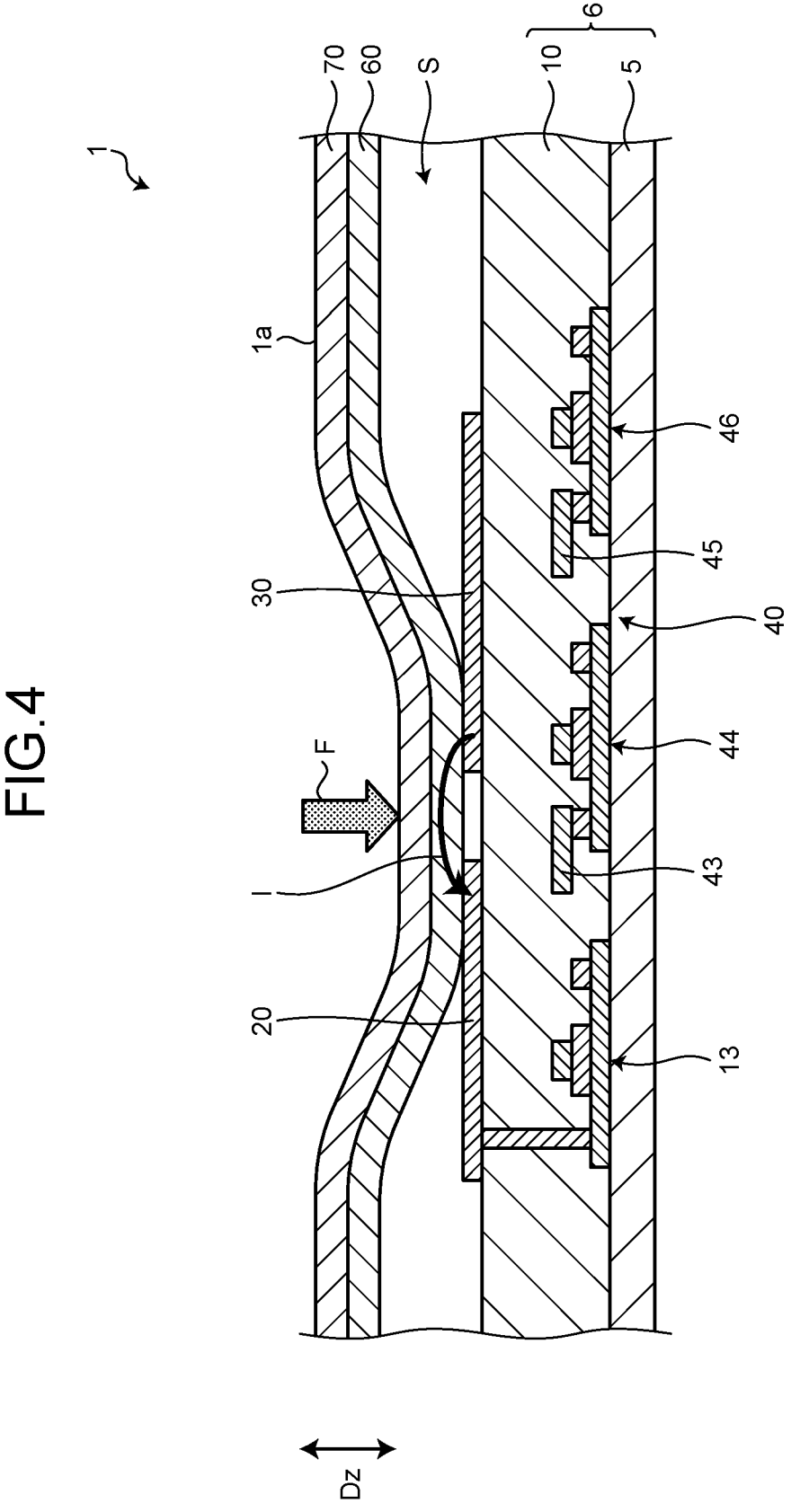
FIG. 4 is a diagram illustrating a state in which force is input to a detection surface of the force sensor of the first embodiment.
Figure 5:
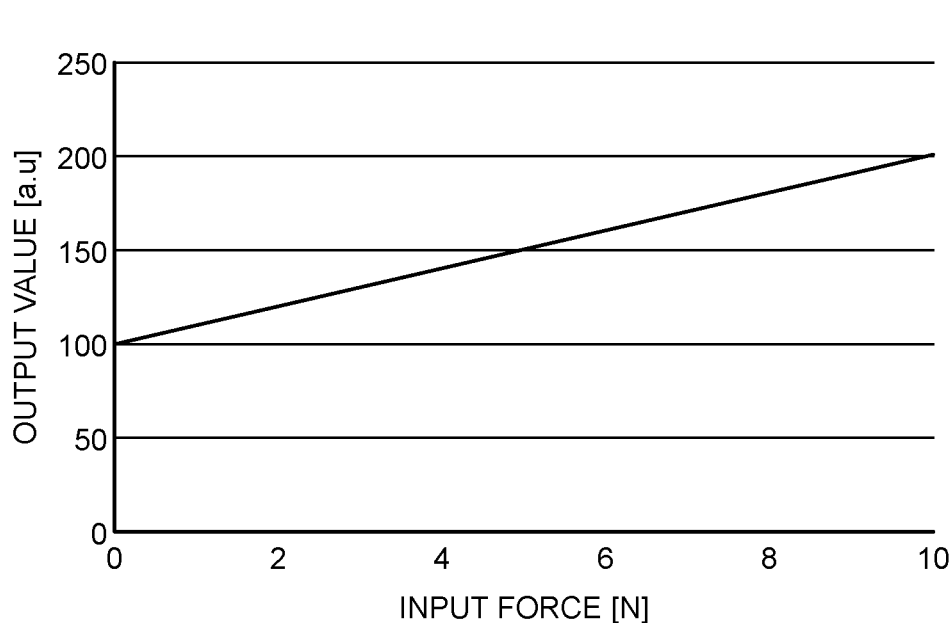
FIG. 5 is a diagram (graph) illustrating the relation between the value of force applied to the force sensor (individual detection regions) and an output value (current value) that is output from a signal line.
Figure 6:
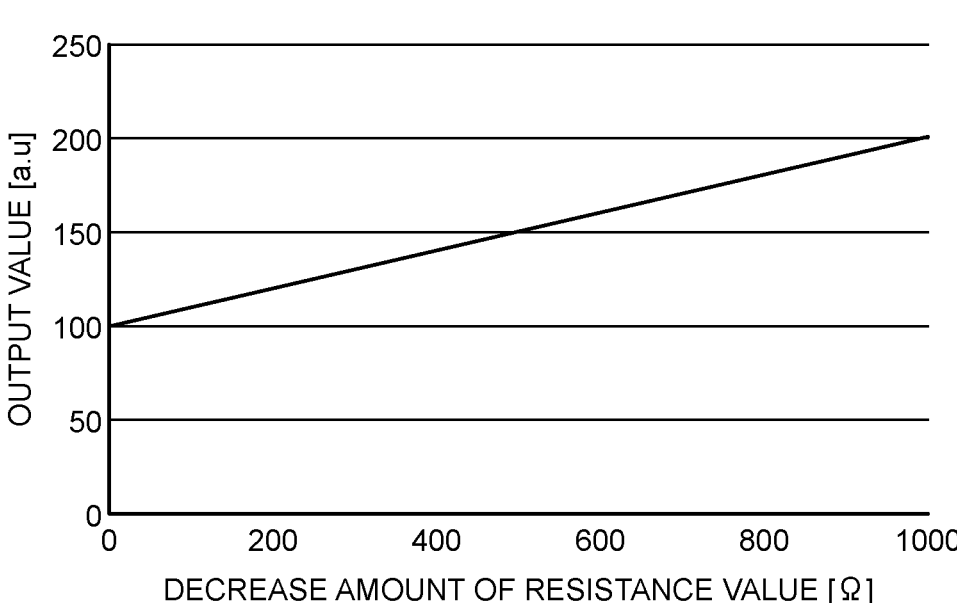
FIG. 6 is a diagram (graph) illustrating the relation between the decrease amount of the resistance value of a sensor layer and an output value (current value) that is output from a signal line.

FIG. 4 is a diagram illustrating a state in which force is input to the detection surface of the force sensor of the first embodiment. FIG. 5 is a diagram (graph) illustrating the relation between the value of force applied to the force sensor (individual detection regions) and an output value (current value) that is output from a signal line. FIG. 6 is a diagram (graph) illustrating the relation between the decrease amount of the resistance value of the sensor layer and the output value (current value) that is output from a signal line. As illustrated in FIG. 4, part of the protective layer 70 and the sensor layer 60 is recessed toward the array substrate 6 when force F is input to the detection surface 1*a*. Accordingly, the sensor layer 60 contacts the detection electrode 20 and the common electrode 30. The resistance value of the sensor layer 60 decreases through deformation by pressing. Accordingly, the detection electrode 20 and the common electrode 30 are electrically coupled to each other through the sensor layer 60. Thus, current (refer to arrow I) flows from the common electrode 30 to the detection electrode 20. Then, the current having flowed to the detection electrode 20 is output to the outside (control device 101) of the force sensor 1 through the signal line 12. With this configuration, whether force is applied to the detection surface 1*a* can be detected based on existence of a signal output from the signal line 12.

As the force F increases, the deformation amount of the sensor layer 60 increases and the resistance value of the sensor layer 60 decreases. In addition, as the force increases, the area of a contact region in which the sensor layer 60 contacts the detection electrode 20 and the common electrode 30 increases and the amount of current flowing to the detection electrode 20 increases. Accordingly, as force applied to the detection surface 1*a* increases, the output value (current value) that is output from the signal line 12 increases. Thus, the magnitude of force applied to the detection surface 1*a* can be detected by measuring the magnitude of the value of current input to the detection electrode 20.

As illustrated in FIG. 5, the magnitude of the value of force input to the force sensor 1 and the magnitude of the output value that is output from the signal line 12 have a proportional relation in the present embodiment.

In the present embodiment, the resistance value of the sensor layer 60 is 1000Ω in a no-load state. The resistance value of the sensor layer 60 is 0Ω when largest possible force is input. Thus, the proportional relation is such that the decrease amount of the resistance value of the sensor layer 60 is larger as input force is larger. Accordingly, in the present embodiment, the proportional relation between the force value and the output value, which is illustrated in FIG. 5 can be replaced with the relation between (proportional relation) the decrease amount of the resistance value of the sensor layer 60 and the output value from the signal line 12 as illustrated in FIG. 6.

In the force sensor 1 described above, a plurality of the detection electrodes 20 arrayed in the first direction Dx are coupled to signal lines 12 at mutually different positions in the first direction Dx. Accordingly, their path lengths to the control device 101 are mutually different. Furthermore, a plurality of the signal lines 12 disposed in the second direction Dy have mutually different characteristics. Thus, different output values are received by the control device 101 in some cases even when force input to the individual detection regions 4 has the same magnitude. The following describes correction circuits 40 and correction gate lines 50 for determining such a characteristic (that is, unevenness) of the output value of each individual detection region 4.

As illustrated in FIG. 3, one correction circuit 40 is provided in each individual detection region 4.

Each correction circuit 40 includes a first wire 41 and a second wire 42. The first wire 41 and the second wire 42 each have one end coupled to the common electrode 30 and the other end coupled to the signal line 12. Accordingly, the first wire 41 and the second wire 42 couple the detection electrode 20 and the drive transistor 13 in parallel.

The first wire 41 is provided with a first resistance component 43 having a first resistance value and a first wire switch element 44 configured to open and close the first wire 41. The second wire 42 is provided with a second resistance component 45 having a second resistance value larger than the first resistance value and a second wire switch element 46 configured to open and close the second wire 42.

The first resistance value of the first resistance component 43 is 200Ω. The first resistance value is relatively small in the range (0Ω to 1000Ω) of resistance value change assumed for the sensor layer 60. The second resistance component 45 is a value larger than the first resistance value and 800Ω. The second resistance value is relatively large in the range (0Ω to 1000Ω) of resistance value change assumed for the sensor layer 60.

As illustrated in FIG. 2, the first wire switch element 44 and the second wire switch element 46 are transistors. The first wire switch element 44 and the second wire switch element 46 include semiconductor layers 44*a* and 46*a*, gate insulating films 44*b* and 46*b*, gate electrodes 44*c* and 46*c*, drain electrodes 44*d* and 46*d*, and source electrodes 44*e* and 46*e*, respectively. The drain electrodes 44*d* and 46*d* are coupled to the signal line 12 (refer to FIG. 3). The source electrodes 44*e* and 46*e* are coupled to the first resistance component 43 and the second resistance component 45, respectively.

As illustrated in FIG. 3, the correction gate lines 50 include a first correction gate line 51 for controlling the first wire switch element 44 and a second correction gate line 52 for controlling the second wire switch element 46. The first correction gate line 51 and the second correction gate line 52 extend in the second direction Dy. The first correction gate line 51 is coupled to the gate electrode 44c of the first wire switch element 44. The second correction gate line 52 is coupled to the gate electrode 46c of the second wire switch element 46. A plurality of the first correction gate lines 51 and a plurality of the second correction gate lines 52 are disposed in the first direction Dx. The first correction gate lines 51 and the second correction gate lines 52 are coupled to the gate line drive circuits 8.

The following describes the control device 101. The control device 101 is what is called a computer and includes a central processing unit (CPU), a random access memory (RAM), a read only memory (ROM), and a storage unit 102 such as a hard disk drive (HDD). The CPU reads and executes a computer program stored in the RAM (performs calculation) and outputs a result of the calculation to a storage device. The RAM is a main memory in and from which computer programs and data can be recorded and read. The ROM stores a computer program such as a basic input/output system (BIOS).

FIG. 7 is a diagram illustrating the process of correction data calculation processing in the first embodiment. The control device 101 executes correction data calculation processing for correcting an output value received from the force sensor 1. As illustrated in FIG. 7, correction data calculation processing S1 includes a first process S11 of acquiring the output value of the individual detection region 4, a second process S12 of calculating an output value characteristic line representing characteristics of the output value of the individual detection region 4, a third process S13 of determining whether the output value characteristic line of every individual detection region 4 is calculated, and a fourth process S14 of calculating correction coefficients (correction data) based on the output value characteristic line.

In the following description, the total number of the individual detection regions 4 of the present embodiment is N. An identification number i (i=1, 2, 3, . . . , N) is allocated to each individual detection region 4 to identify the individual detection region 4. At the first process S11 and the second process S12, one of the individual detection regions 4 is identified, and the first process S11 and the second process S12 are continuously performed for the identified individual detection region 4. One of the individual detection regions 4 is identified in ascending order of the identification number i.

Figures 8, 9:
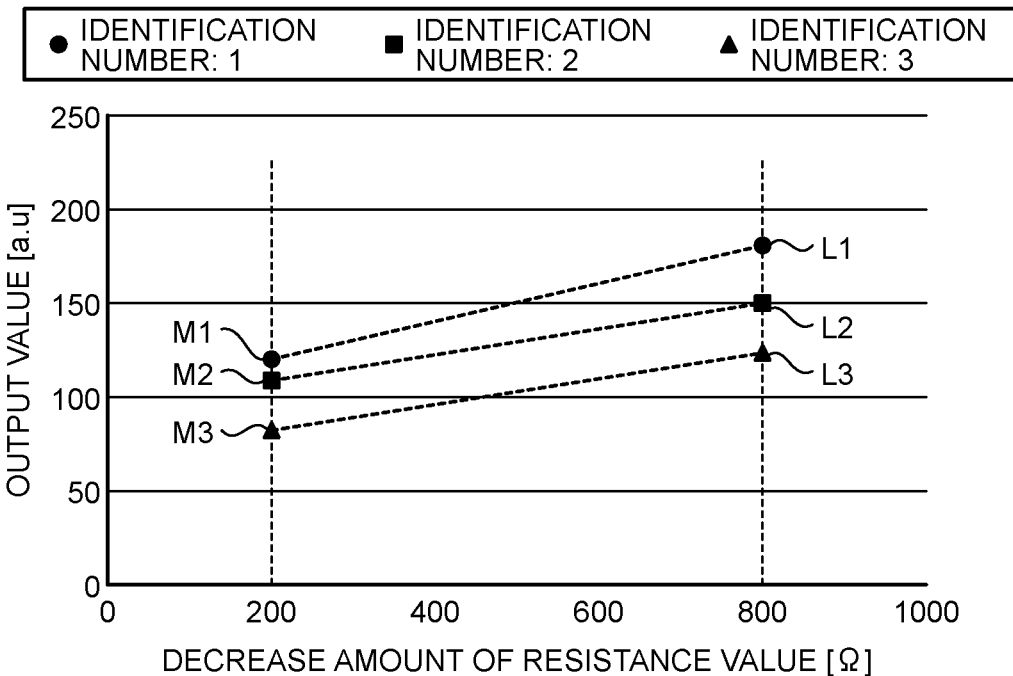
FIG. 8 is a diagram (graph) illustrating the relation between an output value obtained through a first process of a correction data calculation method and the decrease amount of a resistance value.
FIG. 9 is a diagram (graph) illustrating the relation between the decrease amount of the resistance value of the sensor layer and an output value (current value) that is output from a signal line, and is a schematic diagram for description of matching of an output value characteristic line with a correction target line.

FIG. 8 is a diagram (graph) illustrating the relation between the output value obtained through the first process of the correction data calculation processing and the decrease amount of a resistance value. The first process S11 acquires a first output value in a case where the first wire switch element 44 is closed and a second output value in a case where the second wire switch element 46 is closed.

Specifically, at the first process S11, for example, the first correction gate line 51 of the individual detection region 4 corresponding to the identification number i is scanned and the first wire switch element 44 is closed. Accordingly, current flows from the common electrode 30 to the first wire 41. The current is transferred from the signal line 12 to the control device 101 through the first resistance component 43 and the first wire switch element 44. An output value received by the control device 101 in this case is the first output value. Accordingly, characteristics (refer to points L1, L2, L3, . . . ) of the output value in a case where the resistance value of the sensor layer 60 is 200Ω, in other words, in a case where the decrease amount of the resistance value of the sensor layer 60 is 800Ω as illustrated in FIG. 8 are obtained.

Subsequently, the second correction gate line 52 of the individual detection region 4 corresponding to the identification number i is scanned and the second wire switch element 46 is closed. Accordingly, current flows from the common electrode 30 to the second wire 42. The current is transferred from the signal line 12 to the control device 101 through the second resistance component 45 and the second wire switch element 46. An output value received by the control device 101 in this case is the second output value. Accordingly, characteristics (refer to points M1, M2, M3, . . . ) of the output value in a case where the resistance value of the sensor layer 60 is 800Ω, in other words, in a case where the decrease amount of the resistance value of the sensor layer 60 is 200Ω as illustrated in FIG. 8 are obtained.

Through the first process described above, two of the first output value through the first resistance component 43 (in a case where the decrease amount of the resistance value is 800Ω) and the second output value through the second resistance component 45 (in a case where the decrease amount of the resistance value is 200Ω) are obtained in the individual detection region 4 of the identification number i as illustrated in FIG. 8.

The second process S12 calculates the output value characteristic line of the individual detection region 4 corresponding to the identification number i. The output value characteristic line is a straight line connecting the first output value (refer to points L1, L2, L3, . . . ) and the second output value (refer to points M1, M2, M3, . . . ) as illustrated in FIG. 8. The output value characteristic line can be expressed in Expression (1) below.

$$O_{raw\_N} = a_N r + b_N \qquad (1)$$

In Expression (1), $O_{raw\_N}$ represents the output value of the individual detection region 4 with the identification number of N. The number r represents the decrease amount of the resistance value of the sensor layer 60 (Ω). The numbers $a_N$ and $b_N$ are coefficients, and specifically, $a_N$ is the gradient of a straight line in FIG. 8 and $b_N$ is the intercept of the straight line. As illustrated in FIGS. 5 and 6, the output value and the value of force input to the force sensor 1 (the decrease amount of the resistance value of the sensor layer 60) have a proportional relation. Accordingly, a linear function of the resistance value r can be obtained as in Expression (1).

Then, at the second process S12, in order to calculate the coefficients $a_N$ and $b_N$ of the output value characteristic line, the first output value obtained when the first wire switch element 44 is closed is substituted into $O_{raw\_N}$, and 800Ω as the decrease amount of the resistance value of the sensor layer 60 is substituted into r, thereby forming a first equation. Similarly, the second output value obtained when the second wire switch element 46 is closed is substituted into $O_{raw\_N}$, and 200Ω as the decrease amount of the resistance value of the sensor layer 60 is substituted into r, thereby forming a second equation. Then, the coefficients $a_N$ and $b_N$ are calculated from the first equation and the second equation. Accordingly, Expression (1) representing the output value characteristic line of the individual detection region 4 is calculated.

Subsequently, at the third process S13, it is determined whether the output value characteristic line of every individual detection region 4 is calculated. In the present embodiment, the first process S11 and the second process S12 are performed in ascending order of the identification number i of the individual detection region 4. Accordingly, at the third process S13, it is determined whether the identification number i of the individual detection region 4 for which the second process S12 has ended is "N". In a case where the identification number i is "N", the individual detection region 4 is the last one, and thus it is determined that the output value characteristic line of every individual detection region 4 is calculated and the processing proceeds to the fourth process S14. In a case where it is determined that the identification number i is not "N", the processing returns to the first process S11 and the first and second output values of the individual detection region 4 to which the identification number "i+1" is allocated are obtained. In the present disclosure, the first process S11 and the second process S12 may be performed in descending order of the identification number i and the order does not matter.

The fourth process S14 calculates a correction formula for each individual detection region 4. The correction formula is a formula for obtaining an appropriate output value by correcting an output value received from the signal line 12. Specifically, the control device 101 stores Expression (2) below as the correction formula.

$$O_n = A_n O_{raw\_n} + B_n \qquad (2)$$

In the expression, $O_n$ represents an appropriate (corrected) output value and A and B are correction coefficients (correction data). In addition, $O_{raw\_N}$ represents an output value actually received from the signal line 12 and is expressed in Expression (1). The control device 101 stores the correction formula (2) for each individual detection region 4. The following describes a process of calculating the correction coefficients A and B based on the output value characteristic line.

The control device 101 stores a correction target line of Expression (3) below.

$$O_{target} = a_{target} r + b_{target} \qquad (3)$$

FIG. 9 is a diagram (graph) illustrating the relation between the decrease amount of the resistance value of the sensor layer and the output value (current value) output from a signal line, and is a schematic diagram for description of matching of the output value characteristic line with the correction target line. As illustrated in FIG. 9, a correction target line T (refer to a straight line denoted by reference sign T in FIG. 9) is a linear expression for a predetermined output value when a predetermined amount of force is input. Characteristics of the output value characteristic line (refer to dashed lines P1 and P2 in FIG. 9) obtained at the second process S12 should normally match among all individual detection regions 4 but are different among the individual detection regions 4 due to difference in the path lengths of the signal lines 12 and the like. Accordingly, the output value characteristic line is calculated so as to overlap the correction target line T so that the output value characteristic line (refer to dashed lines P1 and P2 in FIG. 9) matches among all individual detection regions 4 (refer to arrows in FIG. 9). The calculation multiplies Expression (1) of the output value characteristic line by a coefficient that changes the gradient and adds a coefficient that changes the intercept to the expression. Specifically, Expression (4) below is obtained.

$$O_n = \frac{a_{target}}{a_n} O_{raw\_n} + \left( b_{target} - \frac{a_{target} b_n}{a_n} \right) \qquad (4)$$

In Expression (4), "$a_{target}/a_N$" is a coefficient that corrects the gradient of Expression (1) and corresponds to the correction coefficient A of Expression (2). In addition, "$b_{target} - ((a_{target} \times b_n)/a_N)$" is a coefficient that corrects the intercept of Expression (1) and corresponds to the correction coefficient B of Expression (2). Accordingly, the correction coefficients A and B of Expression (2) are calculated from the output value characteristic line.

FIG. 10 is a diagram illustrating the correction coefficients A and B stored in the storage unit of the control device. When having calculated the correction coefficients A and B of the individual detection regions 4, the control device 101 stores the correction coefficients A ($A_1$, $A_1$, . . . , $A_n$) and B ($B_1$, $B_1$, . . . , $B_n$) of the individual detection regions 4 in the storage unit 102 as illustrated in FIG. 10 and ends the correction data (the correction coefficients A and B) calculation processing S1 (END).

Through the above-described processing, the correction data (correction coefficients A and B) can be acquired. Moreover, it is possible to eliminate work of preparing a jig that can contact the entire detection region 2 and pressing the jig against the detection region 2. Thus, according to the present embodiment, the correction data (correction coefficients A and B) can be easily acquired. The following describes force value calculation processing S2 of the control device 101.

Figure 11:
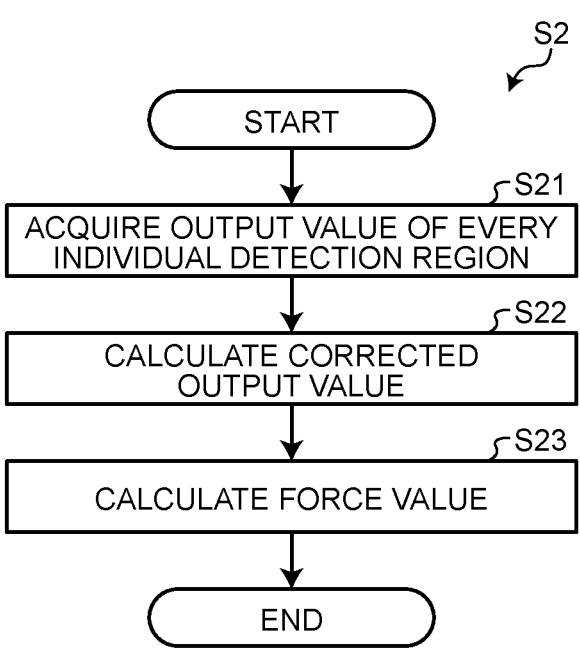
FIG. 11 is a diagram illustrating the process of force value calculation processing of the first embodiment.

FIG. 11 is a diagram illustrating the process of force value calculation processing of the first embodiment. As illustrated in FIG. 11, the force value calculation processing S2 includes a process S21 of acquiring the output value of each individual detection region 4, a process S22 of calculating a corrected output value based on the output value, and a process S23 of calculating a force value based on the corrected output value.

At the process S21 of acquiring the output value of each individual detection region 4, the control device 101 sends a drive signal to the gate line drive circuits 8 and the signal line selection circuit 9. Then, the control device 101 acquires the output value from each individual detection region 4 through the signal line 12.

At the process S22 of correcting the output value, the received output value is substituted into Expression (2). In addition, the correction coefficients A and B of the individual detection region 4 corresponding to the output value are read from the storage unit 102 and substituted into Expression (2) described above. Accordingly, a corrected output value $O_n$ is obtained. Through this process, characteristics (what is called unevenness) of the output value of each individual detection regions 4 are eliminated. Thus, the corrected output value has the same value when the same force is applied.

The process S23 of calculating a force value calculates a force value corresponding to the corrected output value $O_n$. The control device 101 calculates the force value corresponding to the corrected output value $O_n$ based on the correction target line T and ends the calculation processing S2 (END).

Although the first embodiment is described above, the present disclosure is not limited to the above-described example. For example, the control device 101 of the first embodiment stores the calculated correction coefficients A and B in the storage unit 102, but according to the present disclosure, the correction coefficients A and B may be temporarily held in the RAM. Alternatively, the correction coefficients A and B do not necessarily need to be temporarily held as described in the following second embodiment. The second embodiment will be described below.

Second Embodiment

Figure 12:
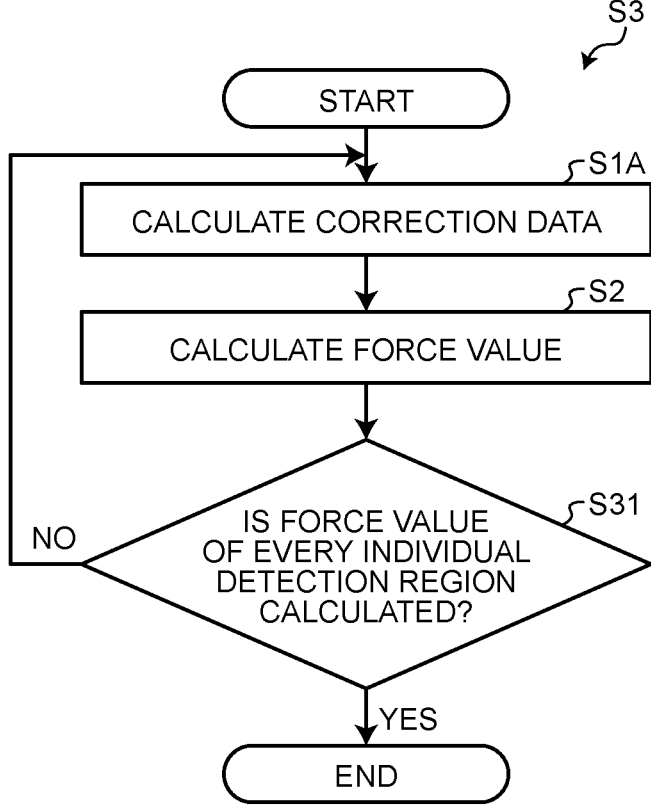
FIG. 12 is a diagram illustrating the process of force value calculation processing according to a second embodiment.

FIG. 12 is a diagram illustrating the process of calculation processing according to the second embodiment. As illustrated in FIG. 12, calculation processing S3 by the control device 101 includes a process S1A of calculating correction data (correction coefficients A and B), a process S2 of calculating a force value, and a process S31 of determining whether the force value of every individual detection region 4 is calculated. The process S2 of calculating a force value performs the same processing as the force value calculation processing S2 described in the first embodiment (refer to FIG. 11). The process S31 of determining whether the force value of every individual detection region 4 is calculated performs the same processing as the third process S13 included in the correction data calculation processing S1 of the first embodiment. Thus, description of the process S2 and the process S31 is omitted.

The process S1A of calculating correction data is the same as the correction data calculation processing S1 of the first embodiment in that the process S1A includes the first process S11, the second process S12, and the fourth process S14 (refer to FIG. 7). However, the process S1A of calculating correction data is different from the first embodiment in that the process S1A does not include the third process S13. Moreover, the process S1A of calculating correction data is different from the first embodiment in that the process S1A proceeds to the process S2 of calculating a force value without storing the correction coefficients A and B after calculating the correction coefficients A and B at the fourth process S14. Thus, in the second embodiment, a force value is continuously calculated without interruption after the process S1A of calculating correction data ends. In other words, in the present embodiment, the correction coefficients are calculated in the units of frames (for each frame) where one frame is a duration in which force detection is completed in all individual detection regions 4. Accordingly, detection accuracy improves.

In the first embodiment, the correction circuits 40 are provided in the respective individual detection regions 4, but the present disclosure is not limited thereto. The following describes a third embodiment and a fourth embodiment in which the correction circuits 40 are not disposed for the respective individual detection regions 4.

Third Embodiment

Figure 13:
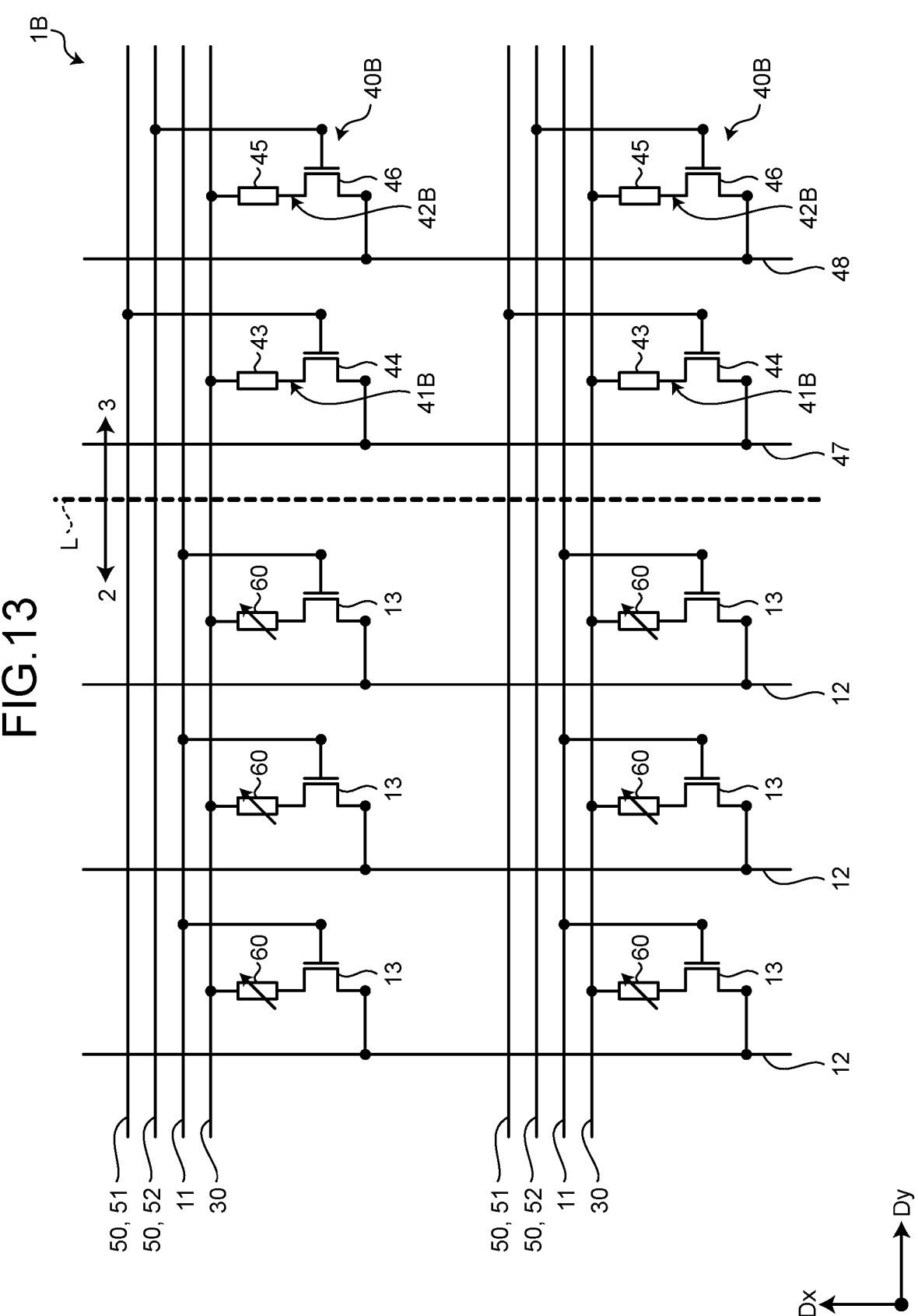
FIG. 13 is a circuit diagram illustrating a circuit configuration of a force sensor of a third embodiment.

FIG. 13 is a circuit diagram illustrating a circuit configuration of a force sensor of the third embodiment. Correction circuits 40B of a force sensor 1B of the third embodiment are different from those of the first embodiment in that each correction circuit 40B is provided for a plurality of the detection electrodes 20 arrayed in the second direction Dy (in that each correction circuit 40B is provided for a row of the detection electrodes 20). Moreover, the force sensor 1B of the third embodiment is different from that of the first embodiment in that the force sensor 1B includes two correction signal lines 47 and 48 extending in the first direction Dx.

A first wire 41B and a second wire 42B of each correction circuit 40B are disposed in the peripheral region 3. Similarly, the correction signal lines 47 and 48 are disposed in the peripheral region 3. The correction signal lines 47 and 48 are coupled to the signal line selection circuit 9. The first wire 41B and the second wire 42B each have one end coupled to the common electrode 30 common to the detection electrodes 20 arrayed in the second direction Dy. The other ends of the first wire 41B and the second wire 42B are coupled to the correction signal lines 47 and 48.

According to the third embodiment, the correction coefficients A and B obtained by each correction circuit 40B are used to correct output values detected in the individual detection regions 4 arrayed in the second direction Dy for the correction circuit 40B. Specifically, the output values detected in the individual detection regions 4 arrayed in the second direction Dy are corrected by the common correction coefficients A and B. Thus, according to the third embodiment, the number of correction coefficients A and B to be calculated decreases. Moreover, characteristics (what is called unevenness) of the output values of the individual detection regions 4 arrayed in the second direction Dy are eliminated.

Fourth Embodiment

Figure 14:
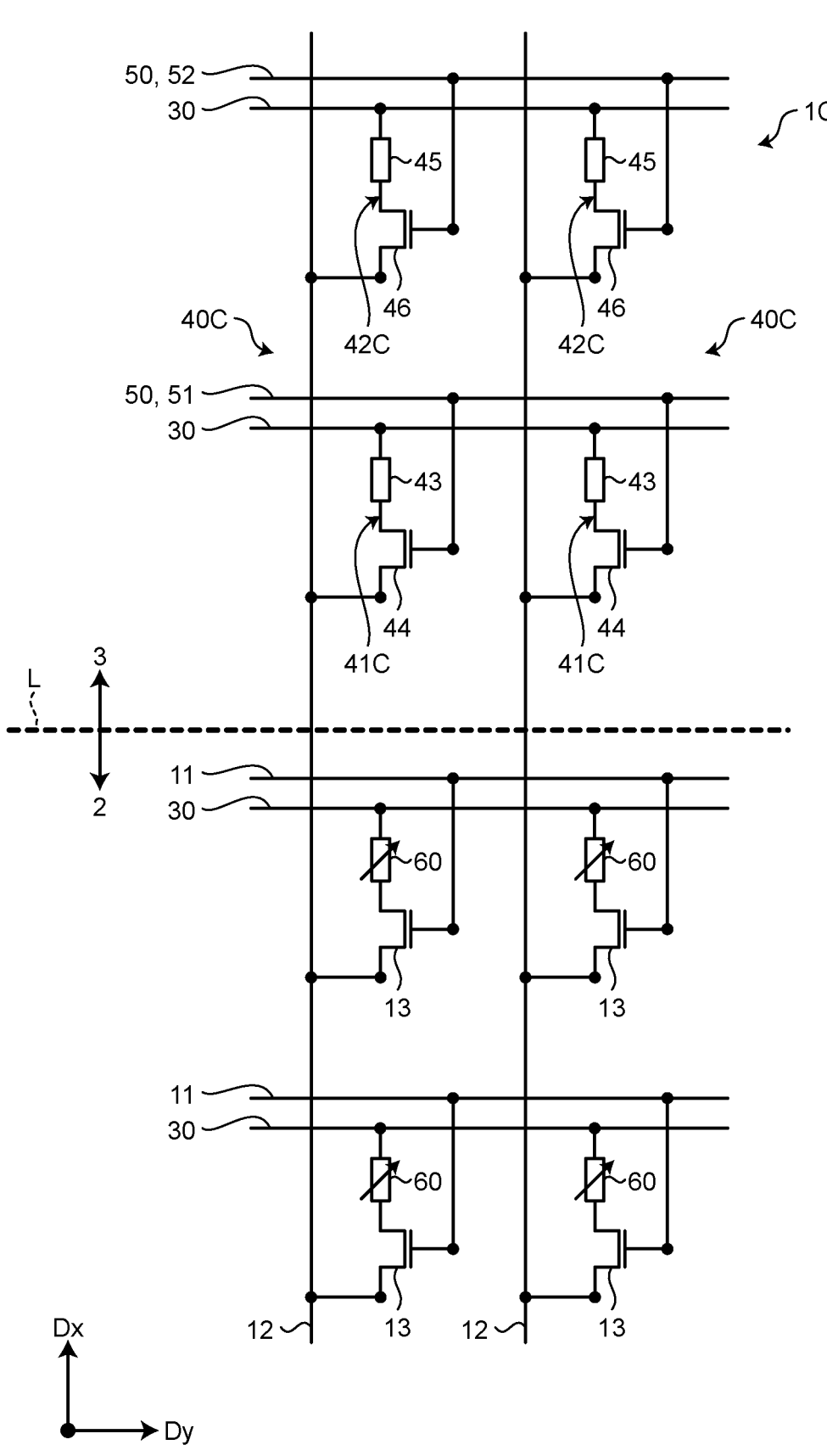
FIG. 14 is a circuit diagram illustrating a circuit configuration of a force sensor of a fourth embodiment.

FIG. 14 is a circuit diagram illustrating a circuit configuration of a force sensor of the fourth embodiment. Correction circuits 40C of a force sensor 1C of the fourth embodiment are different from those of the first embodiment in that each correction circuit 40C is provided for the detection electrodes 20 arrayed in the first direction Dx. A first wire 41C and a second wire 42C of each correction circuit 40C are disposed in the peripheral region 3. In addition, correction gate lines 50C (a first correction gate line 51C and a second correction gate line 52C) and the common electrode 30 are disposed in the peripheral region 3. The first wire 41C and the second wire 42C each have one end coupled to the common electrode 30. The other ends of the first wire 41C and the second wire 42C are coupled to the signal line 12 common to the detection electrodes 20 arrayed in the first direction Dx.

According to the fourth embodiment, the correction coefficients A and B obtained by each correction circuit 40C are used to correct output values detected in the individual detection regions 4 arrayed in the first direction Dx for the correction circuit 40C. Specifically, the output values detected in the individual detection regions 4 arrayed in the first direction Dx are corrected by the common correction coefficients A and B. Thus, according to the third embodiment, the number of correction coefficients A and B to be calculated decreases. Moreover, characteristics (what is called unevenness) of the output values of the individual detection regions 4 arrayed in the first direction Dx are eliminated.

Although the embodiments are described above, the present disclosure only needs to have a proportional relation between force input to each individual detection region 4 and the output value from the signal line 12, and the sensor layer 60 is not limited to that described above. For example, a configuration obtained by adding any one or both of the third embodiment and the fourth embodiment to the above-described configuration of the first embodiment is employable. The following describes modifications of the sensor layer 60.

First Modification

Figure 15:
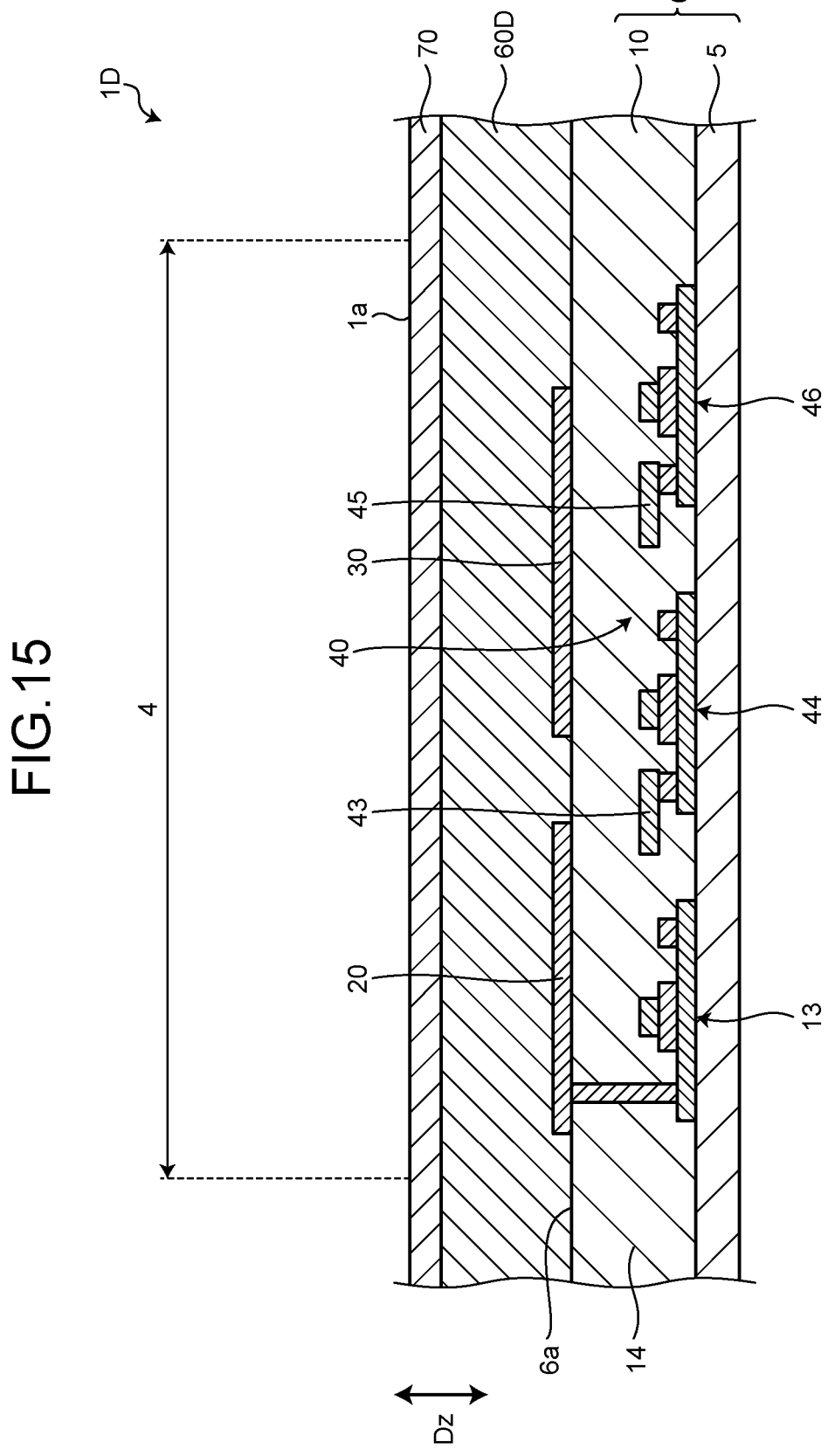
FIG. 15 is a sectional view illustrating a section of a force sensor of a first modification.

FIG. 15 is a sectional view illustrating a section of a force sensor of a first modification. A sensor layer 60D of a force sensor 1D of the first modification is provided between the first surface 6a of the array substrate 6 and the protective layer 70 and no space S (refer to FIG. 2) is provided. The sensor layer 60D contacts the detection electrode 20 and the common electrode 30 even when no deformation occurs. The sensor layer 60D contains conductive fine particles inside insulating resin as described above in the first embodiment. The sensor layer 60 provides insulation when no force is applied, in other words, when no deformation is present. When force is applied and deformation occurs, the resistance value decreases and the common electrode 30 and the detection electrode 20 are electrically coupled to each other. As the force increases, the deformation amount of the sensor layer 60D increases and the amount of current flowing to the detection electrode 20 increases. However, the area of a contact region in which the sensor layer 60D contacts the common electrode 30 and the detection electrode 20 does not change as the force increases. In other words, the sensor layer 60D does not have such a function that the amount of current flowing to the detection electrode 20 changes as the contact area changes, which is a difference from the sensor layer 60 of the first embodiment.

Second Modification

Figure 16:
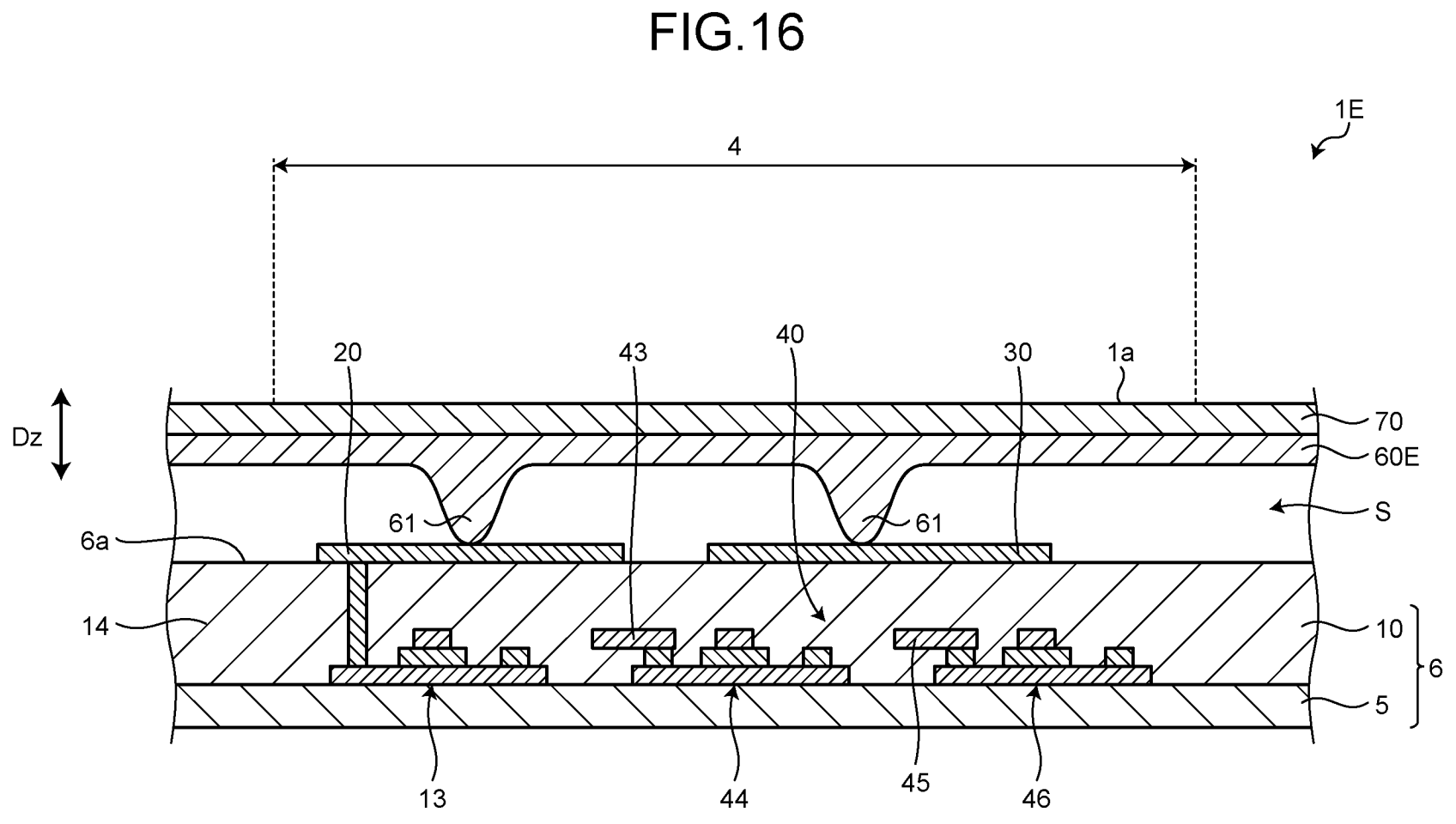
Figure 17:
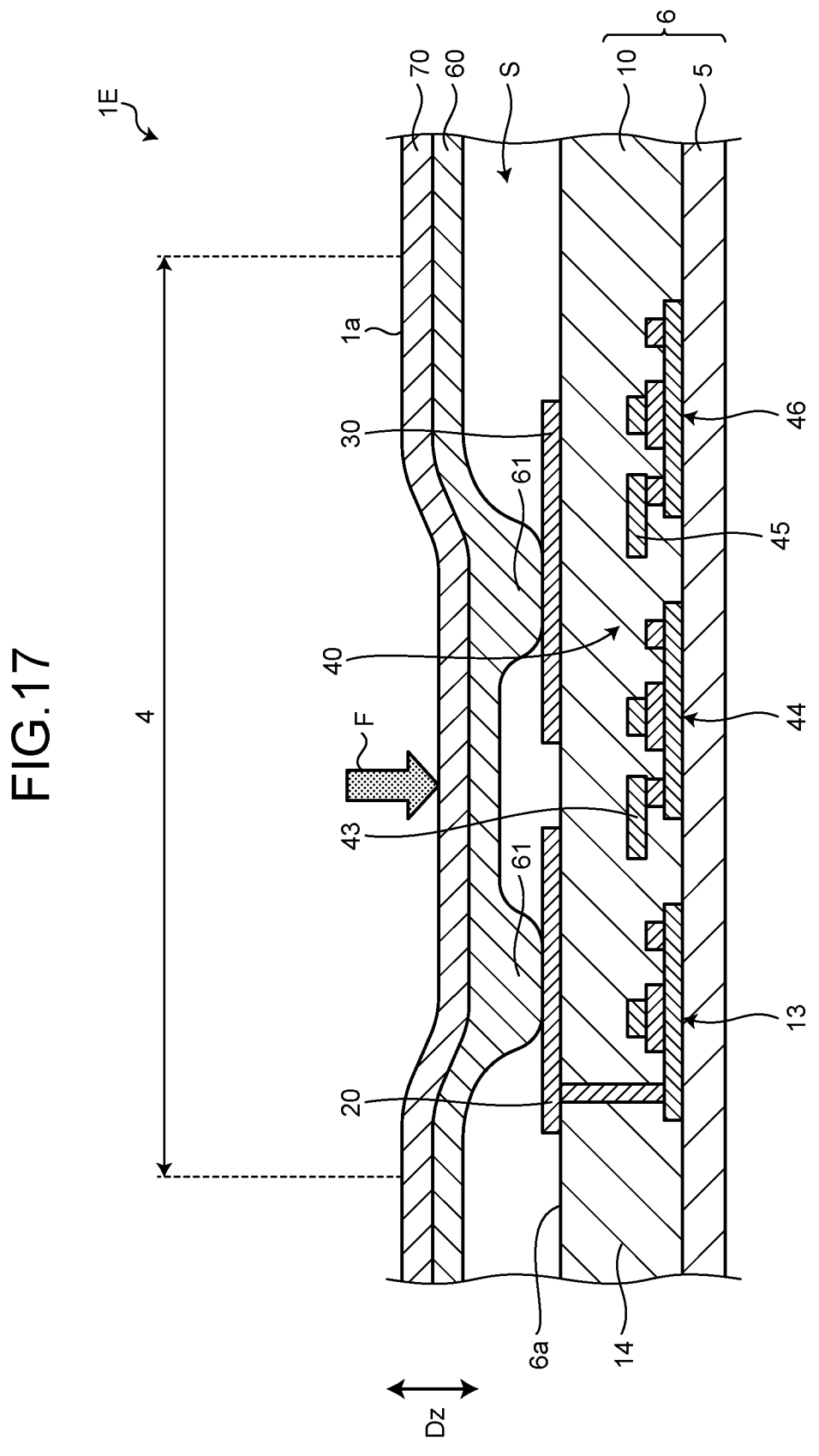
FIG. 17 is a sectional view of the force sensor of the second modification when force is input.

FIG. 16 is a sectional view illustrating a section of a force sensor of a second modification. FIG. 17 is a sectional view of the force sensor of the second modification when force is input. A sensor layer 60E of a force sensor 1E of a fourth modification includes two convex portions 61 protruding toward the detection electrode 20 and the common electrode 30. A distal end part of each convex portion 61 contacts the detection electrode 20 or the common electrode 30. The sensor layer 60E is made of ITO or a semiconductor material and made of a highly insulating material. In such a state, the distal end part of each convex portion 61 has a small area of contact with the detection electrode 20 and the common electrode 30. Accordingly, the detection electrode 20 and the common electrode 30 are not electrically coupled to each other.

However, when the detection surface 1a is pressed as illustrated in FIG. 17, the sensor layer 60E deforms in the third direction Dz and the area of contact between each convex portion 61 and the detection electrode 20 or the common electrode 30 increases. Accordingly, the sensor layer 60E electrically couples the detection electrode 20 and the common electrode 30 and current flows to the detection electrode 20. As force applied to the sensor layer 60E increases, the area of contact between each convex portion 61 and the detection electrode 20 or the common electrode 30 increases, and accordingly, the amount of current flowing through the sensor layer 60E increases. Specifically, the amount of current input to the detection electrode 20 increases in proportion to increase in the area of contact of the sensor layer 60E. Thus, the magnitude of force input to the detection surface 1a can be detected.

The sensor layer 60E of the second modification is described above as an exemplary sensor layer having a resistance value that changes as the area of contact changes, but the force sensor of the present disclosure may include a sensor layer shaped and disposed differently from the sensor layer 60E and is not limited to a particular sensor layer.

The common electrode 30 is disposed on the first surface 6a of the array substrate 6 in the embodiments but may be a solid film provided between the sensor layer 60 and the protective layer 70 and is not particularly limited.

What is claimed is:

1. A force sensor comprising:
a plurality of detection electrodes disposed in respective individual detection regions;
a sensor layer facing the detection electrodes;
a common electrode through which current flows to the detection electrodes via the sensor layer at inputting of force;
a plurality of signal lines that are coupled to the detection electrodes and through which the current having flowed to the detection electrodes is output to outside;
a plurality of switch elements configured to open and close the coupling of the signal lines and the detection electrodes;
a plurality of gate lines for controlling opening and closing of the switch elements;
a plurality of correction circuits disposed in the respective individual detection regions; and
correction gate lines for driving the correction circuits, wherein
a value of the current output through the signal lines is proportional to the magnitude of force input to the individual detection regions,
each correction circuit includes a first wire and a second wire each having one end coupled to the common electrode and the other end coupled to the signal lines, the first wire and the second wire being coupled in parallel to the detection electrodes and the switch elements,
the first wire includes
a first resistance component having a first resistance value, and
a first wire switch element configured to open and close the first wire,
the second wire includes
a second resistance component having a second resistance value larger than the first resistance value, and
a second wire switch element configured to open and close the second wire, and
the correction gate lines include
a first correction gate line for controlling the first wire switch element, and
a second correction gate line for controlling the second wire switch element.

2. A force detection system comprising:
the force sensor according to claim 1; and
a control device configured to calculate a force value based on results of outputting from the signal lines of the force sensor, wherein
the control device
calculates an output value characteristic line for each individual detection region based on a first output value when the first wire switch element is closed and a second output value when the second wire switch element is closed,
calculates a correction coefficient with which the output value characteristic line matches a correction target line representing a desired output value, and
corrects an output value by using the correction coefficient.

3. A force sensor comprising:
a plurality of detection electrodes disposed in respective individual detection regions;

a sensor layer facing the detection electrodes;

a common electrode through which current flows to the detection electrodes via the sensor layer at inputting of force;

a plurality of signal lines that are coupled to the detection electrodes and through which current having flowed to the detection electrodes is received;

a plurality of switch elements configured to open and close the coupling of the signal lines and the detection electrodes;

a plurality of gate lines for controlling opening and closing of the switch elements;

a plurality of correction circuits disposed in a detection target region outside the individual detection regions;

correction gate lines for driving the correction circuits; and a correction signal line for outputting signals from the correction circuits, wherein a value of the current output through the signal lines is proportional to the magnitude of force input to the individual detection regions, the detection electrodes are arrayed in a first direction in which the signal lines extend and a second direction intersecting the first direction, the correction circuits are provided for the respective detection electrodes arrayed in the second direction, each correction circuit includes a first wire and a second wire each having one end coupled with the common electrode common to the detection electrodes arrayed in the second direction and the other end coupled with the correction signal line, the first wire includes
    a first resistance component having a first resistance value, and
    a first wire switch element configured to open and close the first wire, the second wire includes
    a second resistance component having a second resistance value larger than the first resistance value, and
    a second wire switch element configured to open and close the second wire, the correction gate lines include
    a first correction gate line for controlling the first wire switch element, and
    a second correction gate line for controlling the second wire switch element.

4. A force detection system comprising:

the force sensor according to claim 3; and a control device configured to calculate a force value based on results of outputting from the signal lines of the force sensor, wherein the control device
    calculates an output value characteristic line for each individual detection region based on a first output value when the first wire switch element is closed and a second output value when the second wire switch element is closed,
    calculates a correction coefficient with which the output value characteristic line matches a correction target line representing a desired output value, and
    corrects an output value by using the correction coefficient.

5. A force sensor comprising:

a plurality of detection electrodes disposed in respective individual detection regions;

a sensor layer facing the detection electrodes;

a common electrode through which current flows to the detection electrodes via the sensor layer at inputting of force;

a plurality of signal lines that are coupled to the detection electrodes and through which current having flowed to the detection electrodes is received;

a plurality of switch elements configured to open and close the coupling of the signal lines and the detection electrodes;

a plurality of gate lines for controlling opening and closing of the switch elements;

a plurality of correction circuits disposed in a detection target region outside the individual detection regions; and a correction gate lines for driving the correction circuits, wherein a value of the current output through the signal lines is proportional to the magnitude of force input to the individual detection regions, the detection electrodes are arrayed in a first direction in which the signal lines extend and a second direction intersecting the first direction, the correction circuits are provided for the plurality of respective detection electrodes arrayed in the first direction, each correction circuit includes a first wire and a second wire each having one end coupled to the common electrode and the other end coupled to a signal line common to the detection electrodes arrayed in the first direction, each correction circuit includes a first wire and a second wire each having the other end coupled to the signal line, the first wire includes
    a first resistance component having a first resistance value, and
    a first wire switch element configured to open and close the first wire, the second wire includes
    a second resistance component having a second resistance value larger than the first resistance value, and
    a second wire switch element configured to open and close the second wire, and the correction gate lines include
    a first correction gate line for controlling the first wire switch element, and
    a second correction gate line for controlling the second wire switch element.

6. A force detection system comprising:

the force sensor according to claim 5; and a control device configured to calculate a force value based on results of outputting from the signal lines of the force sensor, wherein the control device
    calculates an output value characteristic line for each individual detection region based on a first output value when the first wire switch element is closed and a second output value when the second wire switch element is closed,
    calculates a correction coefficient with which the output value characteristic line matches a correction target line representing a desired output value, and
    corrects an output value by using the correction coefficient.

* * * * *